United States Patent [19]
Yoshida

[11] 4,314,279
[45] Feb. 2, 1982

[54] MATRIX ARRAY CAMERA
[75] Inventor: Hajime Yoshida, Tokyo, Japan
[73] Assignee: Hajime Industries, Ltd., Tokyo, Japan
[21] Appl. No.: 108,594
[22] Filed: Dec. 31, 1979
[30] Foreign Application Priority Data
Dec. 27, 1978 [JP] Japan ............... 53-164941
[51] Int. Cl.³ ............................... H04N 3/14
[52] U.S. Cl. ................................ 358/212; 358/213
[58] Field of Search ................ 358/41, 43, 44, 209, 358/212, 213

[56] References Cited
U.S. PATENT DOCUMENTS
3,980,809  9/1976  Cook .
4,014,000  3/1977  Uno et al. ............ 340/146.3 MA
4,023,048  5/1977  Tompkins ............ 358/212
4,127,877 11/1978  Morishita ........... 358/213
4,204,230  5/1980  Sprague ............ 358/213

Primary Examiner—Michael A. Masinick
Attorney, Agent, or Firm—Eyre, Mann, Lucas & Just

[57] ABSTRACT

An image processing system including a matrix array camera apparatus and an image signal processing apparatus. The camera apparatus includes a matrix arranged image sensing devices consisting of a plurality of picture elements, vertical and horizontal clock signal generators, odd and even number transfer members and a shift register. In this case, from the matrix array camera apparatus an image data of the picture elements lined horizontally from at least 2 neighboring lines is delivered.

3 Claims, 3 Drawing Figures

FIG. 3

| | $t_1$ | | $t_2$ | | $t_3$ |
|---|---|---|---|---|---|
| 1 | | 1 | 2 | 2 | 3 |
| 101 | | 101 | 102 | 102 | 103 |

| $t_{4998}$ | | $t_{4999}$ | | $t_{5000}$ | |
|---|---|---|---|---|---|
| 9897 | 9898 | 9898 | 9899 | 9899 | 9900 |
| 9997 | 9998 | 9998 | 9999 | 9999 | 10000 |

MATRIX ARRAY CAMERA

BACKGROUND OF THE INVENTION

1. Field of the Invention

The present invention is relates generally to matrix array camera apparatus, and to be more specific to an image processing system with matrix array camera apparatus.

2. Description of the Prior Art

At an image processing systems under the prior art, as shown in FIG. 1, a matrix array camera apparatus A is provided which includes a matrix array 1 consisting of 100×100 pieces of picture elements P1, 1; P1, 2;...; P1, 100; P2, 1; P2, 2;...; P100, 100 and an image signal processing apparatus B. In the camera apparatus A a shift register 2 is provided which is connected to a vertical clock generator 3 and the matrix array 1, wherein in accordance with the signals from the vertical clock generator 3, the shift register 2 selects the first, second,... of the horizontal lined picture element groups of the matrix array 1 in sequence. Further, in FIG. 1, 5 is an odd number transfer member and 6 is an even number transfer member, which are respectively connected with the matrix array 1 and also with a horizontal clock generator 4 as well as a buffer 7. These odd and even number transfer members 5 and 6 receive the contents of picture elements of appropriate address in the horizontal lines (odd and even numbers) as selected on the matrix array 1 by the shift register 2, and send the same to buffer 7 in sequence, in accordance with the horizontal clock signals from the horizontal clock generator 4. Buffer 7 is connected to the odd number transfer member 5, even number transfer member 6, and the horizontal clock generator 4, and in accordance with the horizontal clock signal from the horizontal clock generator 4, it alternatingly outputs the contents of even and odd number transfer numbers 5 and 6 as video or image signal v. While the horizontal clock generator 4 is connected with the odd number transfer member 5 and even number transfer member 6, it also outputs a horizontal address signal aH. Simultaneously with sending the vertical clock signal to shift register 2, the vertical clock generator 3 outputs a vertical address signal aV.

On the other hand, in the image signal processing apparatus B a control circuit B1 is provided which receives the address signals aH and aV as well as the image signal v from the matrix array camera apparatus A i.e. generators 4, 3 and buffer 7. Then, the control circuit B1 sends the image signal v to a temporary memory B2 which contains the same number of memory cells to the picture element number of the matrix array 1 after digital conversion, and the image signal v is stored therein. Readout member B3 receives the output from the memory B2 and digitally calculates the relation between each picture element of the matrix array in the memory B2 and sends the same to a register B4 to be stored therein.

It is noted, however, under the above prior art method it is necessary that the temporary memory B2 requires the same number of memory cells as the picture elements of the matrix array 1. In such respect, the more the number of picture elements of the matrix array 1 are increased, the larger the capacity of the temporary memory B2 required. Further, from the stand point of processing time of the contents or informations, since such above mentioned processing system of the prior art starts the processing after the data of one picture frame is stored in temporary memory B2, the system contains a defect that data processing time becomes long as a natural necessity.

OBJECTS AND SUMMARY OF THE INVENTION

Accordingly, an object of the present invention is to provide a novel matrix array camera apparatus free from the defects encountered in the prior art.

Another object of the present invention is to provide an image processing system with a matrix array camera apparatus in which even though the number of picture elements in a matrix array of the camera apparatus may be large, only a small number of memory cells in the temporary memory of an image signal processing apparatus will suffice.

A further object of the invention is to provide an image processing system which can process image data at high speed.

According to an aspect of the invention, an image processing system is provided which comprises;

(a) a matrix array camera apparatus; and (b) an image signal processing apparatus for processing an output signal from said camera apparatus, said camera apparatus including an image sensing device consisting of a plurality of picture elements arranged in a matrix, vertical and horizontal clock signal generator means, odd and even member transfer means and shift register means, said vertical and horizontal clock signal generator means, odd and even number transfer means and shift register means operating said image sensing device in cooperation such that image informations of said picture elements on at least two adjacent horizontal lines are output.

The other objects, features and advantages of the present invention will become apparent from the following description taken in conjunction with the accompanying drawings through which the like references designate the same elements and parts.

BRIEF DESCRIPTION OF THE DRAWINGS

FIG. 3 is a schematic diagram used for explaining the operation of a part of FIG. 2.

DESCRIPTION OF THE PREFERRED EMBODIMENTS

Figure 1:
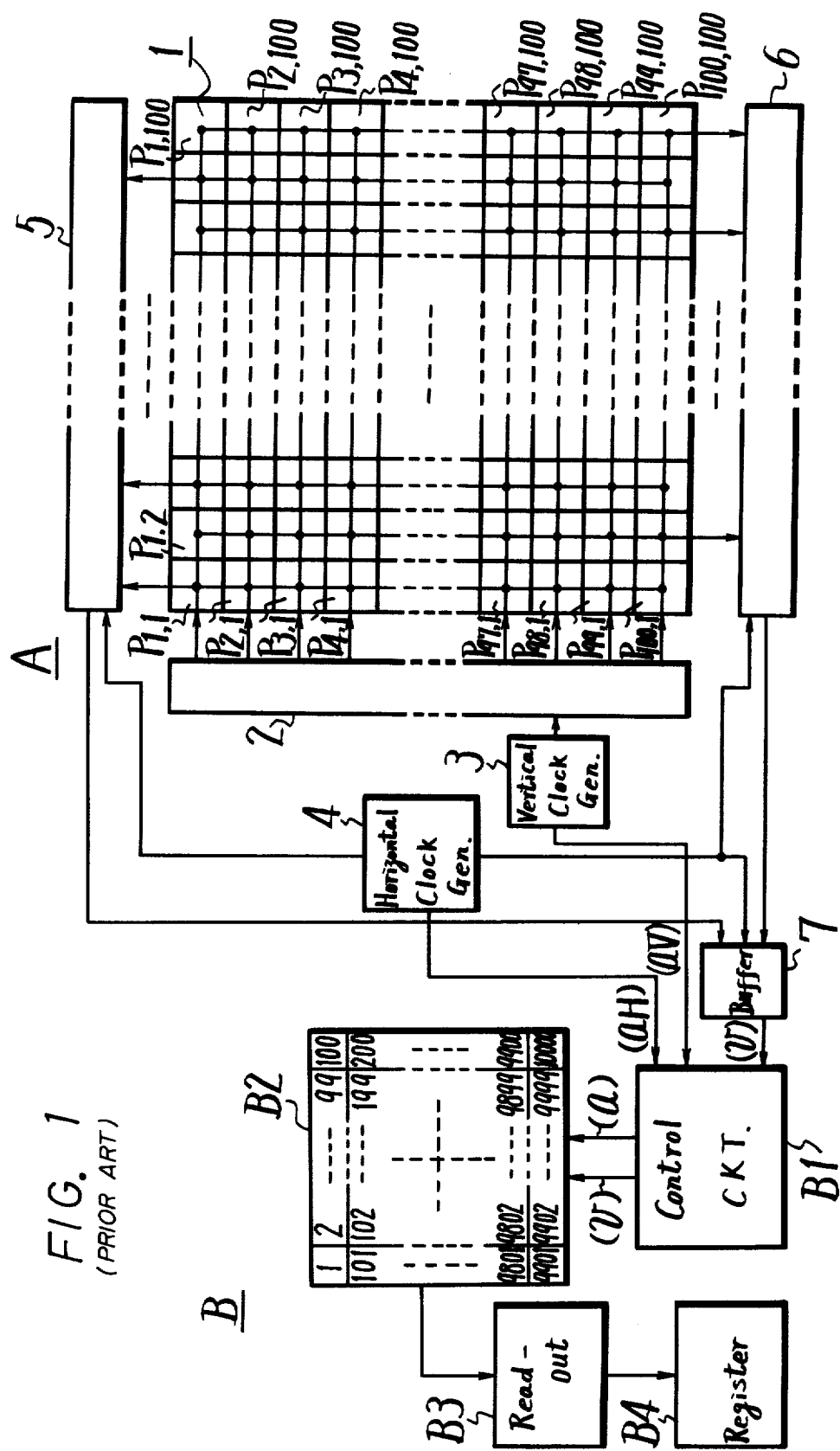
FIG. 1 is a block diagram showing an example of the prior art image information processing system.

An example of the present invention will be explained hereunder in reference with FIG. 2. It is noted that the same references in FIGS. 1 and 2 refer to the same elements respectively.

Figure 2:
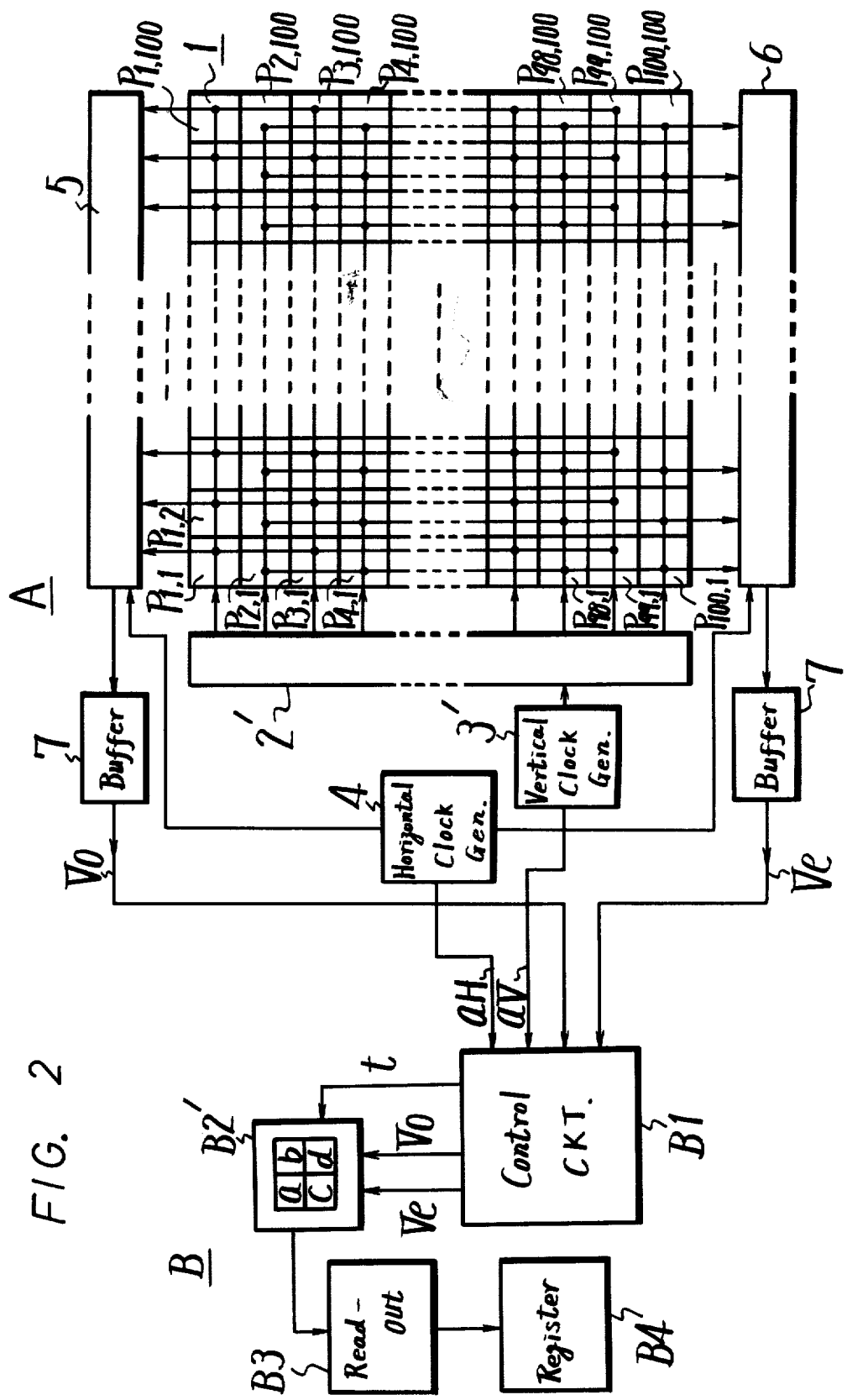
FIG. 2 is a block diagram showing an example of the image information processing system according to the present invention.

In FIG. 2 there are shown a matrix array camera apparatus A which is an example of the present invention and which includes an image sensor or matrix array 1 consisting of, for example, 100×100 picture elements P1, 1;... P100, 100 arranged in the row and column directions and a related image data processing apparatus B of the invention in block diagram. The apparatus A and B form the image processing system of this invention. This matrix camera apparatus A further includes a vertical shift register 2', which receives vertical clock signals from a vertical signal generator 3' and sends selective signals to the matrix array 1 such as from 2 each of horizontal lines of the matrix array 1, in other words, the horizontal 1st and 2nd lines, the 3rd and 4th lines, . . . . Further, the camera apparatus A includes an odd number transfer member 5 and an even number transfer member 6, which each are connected with the matrix array 1 and the horizontal clock generator 4. The odd number transfer member 5 receives the contents on the odd number lines of the horizontal lines of the matrix array 1 as selected by the shift register 2′, such as P1, 1; . . . ; P1, 100; P3, 1; . . . ; P99, 1; . . . ; P99, 100 while the even number transfer member 6 receives from the even numbered horizontal lines, as selected by the shift register 2′, the contents on the picture elements such as P2, 1; . . . ; P2, 100; P4, 1; . . . ; P100, 1; . . . ; P100, 100; and these contents are output through buffers 7 and 7 as odd and even image signals Vo and Ve respectively in accordance with the signals from the horizontal clock generator 4. In other words, for instance, when the first clock from the vertical clock generator 3′ is supplied to the vertical shift register 2′, this shift register 2′ outputs a signal to transfer the picture element data of P1, 1; . . . ; P1, 100 and P2, 1; . . . ; P2, 100 from the 1st and 2nd horizontal lines to the odd and even number transfer members 5 and 6 respectively.

On the other hand, to such odd and even number transfer members 5 and 6, a horizontal clock signal is supplied respectively from the horizontal clock generator 4 so that the data that are supplied from picture elements P1, 1; . . . ; P1, 100 and P2, 1; P2, 100 to the members 5 and 6 by the horizontal clock signal are output from odd and even number transfer members 5 and 6 respectively in sequence. When the second clock signal from the vertical clock generator 3′ is supplied to the shift register 2′, the data from picture elements P3, 1; . . . ; P3, 100 and P4, 1; . . . P4, 100 from the 3rd and 4th horizontal lines are processed in the same manner. Thereafter, the same function will be repeated and one picture frame is scanned. It is noted that more than 100 horizontal clock signals are necessary during 1 vertical clock signal. The horizontal clock generator 4 is connected with odd and even number transfer members 5 and 6 while it also outputs horizontal address signals aH. The vertical clock generator 3′ also outputs vertical address signals aV. In this case, the horizontal address signal aH and the horizontal clock signal may be the same or other wise may be binary coded or decimal scale as convenient. The same can be said for the vertical address signal aV.

On the other hand, at the image signal processing apparatus B of this invention, as in the conventional art, control circuit B1, temporary memory B2′, reader member B3 and register B4 are provided, respectively. Control circuit B1 receives the signals aH, aV, Vo and Ve from the matrix array camera apparatus A or clock generators 4, 3′ and buffers 7, 7 and outputs image signals Vo and Ve as well as a timing signal t to the temporary memory B2′. That is, the control circuit B1 includes a decoder circuit which makes clock signals to transfer image signals Vo and Ve to the temporary memory B2′ by receiving the horizontal address signal aH and vertical address signal aH and vertical address signal aV, a counter circuit which produces an inhibit signal which inhibits the signal transfer from the temporary memory B2′ to the discriminator B3 when the timing of the decoded clock signal is not necessary (such as the case of t1 on FIG. 3), and a mixer circuit which combines the clock signal and inhibit signal to form a timing signal t. It is noted that in this example, temporary memory B2′ contains, for example, only 4 memory cells which are marked with a, b, c and d. By the timing signal t which is made at the control circuit B1 based upon the address signals aH and aV, the image signals Vo of picture elements P1, 1; . . . ; P1, 100; P3, 1; . . . ; P3, 100; . . . ; P99, 1; . . . ; P99, 100 of the odd number lines (Horizontal) of the matrix array 1 are taken into the memory cell b while the image signals Ve of the picture elements in the even number lines (Horizontal) of the matrix array 1 such as P2, 1; . . . ; P2, 100; P4, 1; . . . ; P4, 100; . . . ; P100, 1; . . . ; P100, 100 are taken into memory cell d in sequence and order by address signals aH and aV respectively. And then, the contents of memory cell b is taken into memory cell a while the contents of memory cell d are taken into memory cell c in accordance with the timing signal t, respectively. Therefore, the contents of memory cells a and b as well as c and d are as shown in FIG. 3 by respective timings t1, t2, . . . , t5000 of the timing signal t.

The reader member B3 segregates the signals from the memory cells a, b, c and d of the temporary memory B2′ into relative prearranged classifications and sends same to register B4 to be stored therein.

The function of the matrix array camera apparatus A of the invention which is constructed as above described will be explained in the following. An outer scenery which is projected onto the matrix array 1 of the matrix array camera apparatus A which is the photo electric converter, through a lens (which is not illustrated on the drawings) is photo electrically converted into image or video signals whereas the odd and even image signals Vo and Ve as well as the address signals aH and aV are output from the matrix array camera apparatus A at the same time. On the other hand, the image signal processing apparatus B receives the image signals Vo and Ve as well as address signals aH and aV from the matrix array camera apparatus A at the control circuit B1. At the control circuit B1, as the first action, the clock signal is made based upon the supplied address signals aH and aV. As the next step, the necessity or not of the clock signal is judged by the count value from the counter circuit, and when not necessary, the inhibit signal which inhibits the signal transfer from the temporary memory B2′ to the discriminator B3 is made. The image signals Vo and Ve as supplied from the matrix array camera apparatus A are synchronized to the clock signal and are sent to the temporary memory B2′. Further, the clock signal and the inhibit signals are mixed and are supplied to the temporary memory B2′ as a timing signal t. Temporary memory B2′ stores the image signals Vo and Ve as supplied from the control circuit B1 in accordance with the timing signal t, as well as supply the same to the discriminator B3 in accordance with the timing signal t. At the reader member B3, the mutual relation between each image signal that are stored in each memory cells a, b, c and d of the temporary memory B2′ is discriminated, for instance, segregated into 16 classifications, and such data is sent to the register B4. The 16 classified data as sent from the reader B3 are stored in sequence at the register B4. Of course, in this case, if not all of the 16 classified data are necessary, the unnecessary data may be deleted.

As described in the above, with the image processing system including the matrix array camera apparatus and the image signal processing apparatus according to the present invention, upon image signal processing, the image signal is preprocessed at the same time that the matrix array 1 is scanned, so that when the scanning of one picture frame is finished, the already preprocessed data is stored in the register B4, which avails a very short processing time. Further, while the systems under the prior art require for instance 10,000 memory cells at the temporary memory B2, in the example of the present invention as above explained, only 4 memory cells are necessary in the temporary memory B2' which provides merit from cost and space standpoints.

It is noted further that the above cited example of the invention uses the matrix array which is formed by 100 each picture elements in each horizontal line as well as 100 each picture elements in each vertical line, but this is merely one example and the number of picture elements may be properly selected.

It is also noted that while in the above description of the present invention, the image data of the picture elements lined horizontally from two neighboring lines are output in sequence, but in the same respect, the image data from the picture elements of the neighboring 3 or 4 lines may also be output. It is needless to say that the number of transfer functions shall increase relatively.

I claim as my invention:

1. An image processing system comprising:
  (a) a matrix array camera apparatus including an image sensing device comprising a plurality of picture elements arranged in a matrix, vertical and horizontal clock signal generator means, odd and even number transfer means, and a shift register, said shift register being supplied with a vertical clock signal from said vertical and horizontal clock signal generator means for simultaneously driving image information from said picture elements on at least two adjacent horizontal lines of said matrix to transfer said image information to said odd and even number transfer means, said odd and even number transfer means being supplied with a horizontal clock signal from said vertical and horizontal clock generator means for simultaneously outputting the image information of the picture elements of said two adjacent horizontal rows; and
  (b) an image signal processing apparatus for processing the image information comprising a control circuit for receiving said image information from said two adjacent horizontal rows as well as said vertical and horizontal clock signals for generating a timing signal therefrom and a temporary memory for temporarily serially storing the image information and outputting it therefrom in accordance with the timing signal received from said control circuit, said temporary memory having fewer memory cells than the number of picture elements of said at least two adjacent horizontal lines.

2. An image processing system as claimed in claim 1 further comprising buffer means for buffering the output of said odd and even number transfer means.

3. An image processing system as claimed in claim 1 further comprising a reader member for receiving the output from said temporary memory, for discriminating and classifying the information received therefrom and outputting data therefrom, and a register for receiving and storing the output data.

* * * * *